US010822095B2

(12) United States Patent
DeFrancesco et al.

(10) Patent No.: US 10,822,095 B2
(45) Date of Patent: Nov. 3, 2020

(54) ADVANCED ENVIRONMENTAL CONTROL SYSTEM IN AN INTEGRATED PACK ARRANGEMENT WITH ONE BLEED/OUTFLOW HEAT EXCHANGER

(71) Applicant: HAMILTON SUNDSTRAND CORPORATION, Windsor Locks, CT (US)

(72) Inventors: Gregory L. DeFrancesco, Simsbury, CT (US); Donald E. Army, Enfield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 15/484,831

(22) Filed: Apr. 11, 2017

(65) Prior Publication Data

US 2018/0215474 A1 Aug. 2, 2018

Related U.S. Application Data

(60) Provisional application No. 62/451,224, filed on Jan. 27, 2017.

(51) Int. Cl.

| B64D 13/06 | (2006.01) |
| B64D 13/04 | (2006.01) |
| B64D 13/08 | (2006.01) |
| B64D 13/00 | (2006.01) |
| B64D 13/02 | (2006.01) |

(52) U.S. Cl.
CPC ............. *B64D 13/06* (2013.01); *B64D 13/04* (2013.01); *B64D 13/08* (2013.01); *B64D 13/00* (2013.01); *B64D 13/02* (2013.01); *B64D 2013/0603* (2013.01); *B64D 2013/064* (2013.01); *B64D 2013/0618* (2013.01); *B64D 2013/0648* (2013.01); *B64D 2013/0662* (2013.01); *B64D 2013/0688* (2013.01); *Y02T 50/56* (2013.01)

(58) Field of Classification Search
CPC ........ B64D 13/06; B64D 13/00; B64D 13/02; B64D 13/04; B64D 13/08; B64D 2013/0603; B64D 2013/0618; B64D 2013/0662; B64D 2013/0688
USPC ........................... 62/87, 93, 172, 238.2, 401
See application file for complete search history.

(56) References Cited

U.S. PATENT DOCUMENTS

| 5,299,763 A * | 4/1994 | Bescoby ................ B64D 13/06 244/118.5 |
| 5,461,882 A * | 10/1995 | Zywiak .............. B60H 1/00007 62/401 |
| 5,704,218 A | 1/1998 | Christians et al. |

(Continued)

FOREIGN PATENT DOCUMENTS

EP  3219618 A1  9/2017

OTHER PUBLICATIONS

Extended European Search Report for Application No. 18153858.8-1010 dated Jun. 4, 2018 (8 pp.).

*Primary Examiner* — Joseph F Trpisovsky
(74) *Attorney, Agent, or Firm* — Cantor Colburn LLP

(57) ABSTRACT

An environmental control system of an aircraft includes a ram air circuit having a ram air shell with at least one heat exchanger positioned therein. A dehumidification system is arranged in fluid communication with the ram air circuit and a plurality of compressing devices is arranged in fluid communication with the ram air circuit and the dehumidification system.

18 Claims, 1 Drawing Sheet

(56) References Cited

U.S. PATENT DOCUMENTS

| | | |
|---|---|---|
| 6,295,822 B1 | 10/2001 | Mueller |
| 6,942,183 B2 | 9/2005 | Zywiak |
| 6,981,388 B2 | 1/2006 | Brutscher et al. |
| 7,188,488 B2 | 3/2007 | Army, Jr. et al. |
| 9,669,936 B1 | 6/2017 | Fiterman et al. |
| 2003/0084681 A1 | 5/2003 | Haas |
| 2004/0194493 A1* | 10/2004 | Army, Jr. ............... B64D 13/06 62/402 |
| 2006/0231680 A1* | 10/2006 | Derouineau ........... B64D 13/02 244/118.5 |
| 2012/0285184 A1 | 11/2012 | Voinov |
| 2015/0251765 A1 | 9/2015 | Jonqueres et al. |
| 2015/0314877 A1 | 11/2015 | McAuliffe et al. |
| 2016/0083100 A1* | 3/2016 | Bammann ............... B64D 13/06 62/89 |
| 2016/0311538 A1 | 10/2016 | Bruno et al. |
| 2017/0341759 A1 | 11/2017 | Bruno et al. |

\* cited by examiner

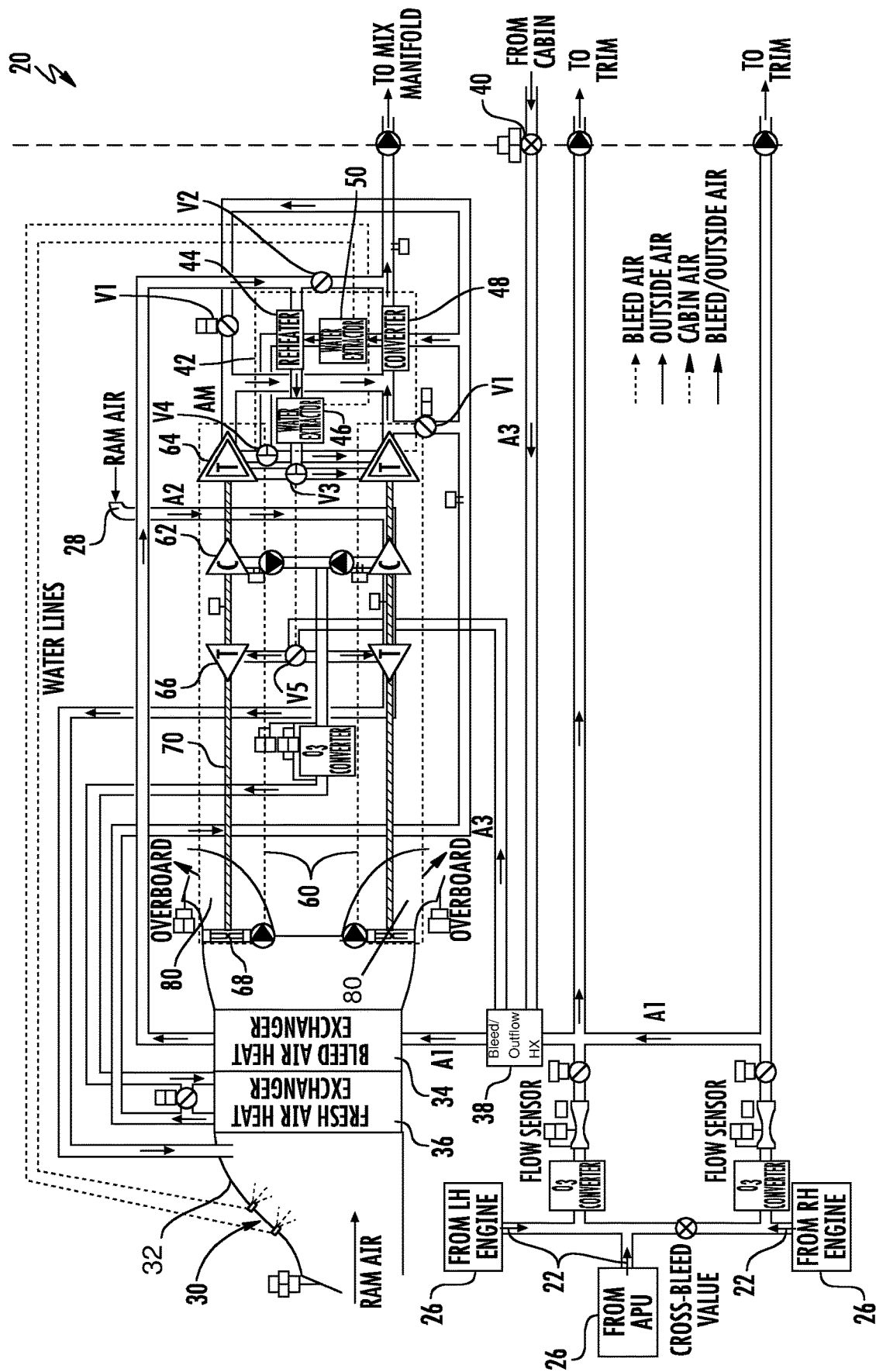

ADVANCED ENVIRONMENTAL CONTROL SYSTEM IN AN INTEGRATED PACK ARRANGEMENT WITH ONE BLEED/OUTFLOW HEAT EXCHANGER

CROSS REFERENCE TO RELATED APPLICATIONS

This application claims the benefit of U.S. Provisional Application No. 62/451,224, filed Jan. 27, 2017, the contents of which are incorporated by reference in its entirety herein.

BACKGROUND

Exemplary embodiments pertain to the art of environment control systems and, in particular, to an aircraft environmental control system (ECS).

In general, contemporary air conditioning systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the cabin outflow air to compress outside air and bring it into the cabin. Each of these approaches alone provides limited efficiency with respect to engine fuel burn. An approach using bleed and cabin outflow air to power a single integrated refrigeration package, offering the operational redundancy of a typical two-pack ECS is described herein.

BRIEF DESCRIPTION

According to an embodiment, an environmental control system of an aircraft includes a ram air circuit having a ram air shell with at least one heat exchanger positioned therein. A dehumidification system is arranged in fluid communication with the ram air circuit and a plurality of compressing devices is arranged in fluid communication with the ram air circuit and the dehumidification system.

In addition to one or more of the features described above, or as an alternative, in further embodiments the plurality of compressing devices are arranged in parallel.

In addition to one or more of the features described above, or as an alternative, in further embodiments comprising at least one valve operable to control a flow of fluid to the plurality of compressing devices.

In addition to one or more of the features described above, or as an alternative, in further embodiments in a first position, the at least one valve is configured to direct the flow of fluid to only a portion of the plurality of compressing devices.

In addition to one or more of the features described above, or as an alternative, in further embodiments in a first position, the at least one valve is configured to direct the flow of fluid to each of the plurality of compressing devices.

In addition to one or more of the features described above, or as an alternative, in further embodiments the ram air circuit includes a plurality of independent outlets formed in the shell.

In addition to one or more of the features described above, or as an alternative, in further embodiments at least one outlet is associated with each of the plurality of compressing devices.

In addition to one or more of the features described above, or as an alternative, in further embodiments the plurality of compressing devices are substantially identical.

In addition to one or more of the features described above, or as an alternative, in further embodiments each of the plurality of compressing devices further includes: a turbine comprising a first inlet and a second inlet and configured to provide energy by expanding one or more mediums, the first inlet being configured to receive a first medium of the one or more mediums and the second inlet being configured to receive a second medium of the one or more mediums; and a compressor configured to receive energy from at least one of the first medium and the second mediums being expanded across the turbine, the compressor being configured to compress the second medium.

In addition to one or more of the features described above, or as an alternative, in further embodiments the environmental control system is operable in a plurality of modes, and during operation in at least one of the plurality of modes, the first medium and the second medium are mixed within the turbine.

In addition to one or more of the features described above, or as an alternative, in further embodiments the environmental control system is operable in a plurality of modes, and during operation in at least one of the plurality of modes, the first medium and the second medium are mixed downstream from the turbine.

In addition to one or more of the features described above, or as an alternative, in further embodiments the first medium is bleed air and the second medium is fresh air.

In addition to one or more of the features described above, or as an alternative, in further embodiments each of the compressing devices further includes a power turbine configured to provide energy to the compressor by expanding a third medium of the one or more mediums.

In addition to one or more of the features described above, or as an alternative, in further embodiments the turbine, compressor, and power turbine are operably coupled via a shaft.

In addition to one or more of the features described above, or as an alternative, in further embodiments each of the plurality of compressing devices further includes a fan configured to receive energy from at least one of the first medium and the second mediums being expanded across the turbine.

In addition to one or more of the features described above, or as an alternative, in further embodiments the environment control system is mounted within a single bay of the aircraft.

In addition to one or more of the features described above, or as an alternative, in further embodiments the single bay includes a tail cone of the aircraft.

In addition to one or more of the features described above, or as an alternative, in further embodiments the bleed air circuit is operably coupled to a first engine, a second engine, and an auxiliary power unit.

BRIEF DESCRIPTION OF THE DRAWINGS

The following descriptions should not be considered limiting in any way. With reference to the accompanying drawings, like elements are numbered alike:

FIG. 1 is schematic illustration of an environmental control system of according to an embodiment.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Embodiments herein provide an environmental control system of an aircraft that mixes mediums from different sources and uses the different sources to power the environmental control system and to provide cabin pressurization and cooling at high fuel burning efficiency. The mediums described herein are generally types of air; however, it should be understood that other mediums, such as gases, liquids, fluidized solids, or slurries are also contemplated herein.

With reference now to FIG. 1, a schematic diagram of an environment control system (ECS) is depicted according to non-limiting embodiments. Although the environmental control system 20 is described with reference to an aircraft, alternative applications are also within the scope of the disclosure.

As shown in the FIG., the system 20 can receive a first medium A1 at a first inlet 22 and provide a conditioned form of the first medium A1 to a volume 24. The conditioned form of the first medium A1 provided to the volume may be independent or may be a component of a mixed medium AM, as described in more detail below. In embodiments where the environmental control system 20 is used in an aircraft application, the first medium A1 is bleed air, which is pressurized air originating from i.e. being "bled" from, an engine or auxiliary power unit of the aircraft, illustrated schematically at 26. Note that one or more of the temperature, humidity, and pressure of the bleed air can vary based upon a compressor stage and revolutions per minute of the engine.

The system 20 can receive a second medium A2 from an inlet 28 and provide a conditioned form of the second medium A2 to the volume 24, for example as a portion of the mixed medium AM. In an embodiment, the second medium A2 is fresh air, such as outside air for example. The outside air can be procured via one or more scooping mechanisms, such as an impact scoop or a flush scoop for example. Thus, the inlet 28 can be considered a fresh air inlet or an outside air inlet. Generally, the fresh air A2 described herein is at an ambient pressure outside of the aircraft with respect to altitude.

The system 20 can further receive a third medium A3 from the volume 24. In an embodiment, the third medium A3 is cabin discharge air, which is air leaving the volume 24 and is discharged overboard. For example, the cabin discharge air can be supplied to a destination, such as an outlet. Examples of the outlet can include, but are not limited to, a ram circuit and/or an outflow valve (which exhaust overboard).

The system 20 is configured to extract work from the third medium A3. In this manner, the pressurized air of the volume 24 can be utilized by the system 20 to achieve certain operations required at different altitudes. Thus, based on modes of operation, the system 20 can mix the first medium A1, the second medium A2, and/or the third medium A3 to produce the mixed medium AM. The mixed medium AM can be mixed air that meets fresh air requirements set by aviation organizations.

The environmental control system (ECS) 20 includes a RAM air circuit 30 including a shell or duct 32 within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a primary heat exchanger 34 and a secondary heat exchanger 36. Within the primary and secondary heat exchangers 34, 36, ram air, such as outside air for example, acts as a heat sink to cool the first medium A1, for example bleed air, and/or the second medium A2, for example fresh air. In a non-limiting embodiment, an exhaust of the cabin discharge air A3 can be released through the shell 32 of the ram circuit 30 and used in conjunction or in place of the ram air.

The system 20 additionally includes an outflow heat exchanger 38. The outflow heat exchanger 38 may be arranged upstream from the primary heat exchanger 34 such that initial cooling of the first medium A1 is performed within the outflow heat exchanger 38 and secondary cooling of the first medium A1 is performed in the primary heat exchanger 34. In an embodiment, the third medium A3, such as exhaust of cabin air for example, is recirculated to the system 20 from the pressurized volume 24, through a valve 40. As shown, the third medium A3 may be selectively provided via operation of the valve 40 to the outflow heat exchanger 38, where heat is transferred to the third medium A3 via a heat exchange relationship with the first medium A1, before being provided to another component of the system.

The system 20 also comprises a dehumidification system 42 including a reheater 44, a water extractor 46, a condenser 48, and another water extractor 50. The water extractors 46 and 50 are mechanical devices that perform a process of removing water from a medium. The reheater 44 and condenser 48 are particular types of heat exchangers. In a non-limiting embodiment, a reheater 44 and/or a water extractor 46 can combine to form a high pressure water separator that removes moisture at a highest pressure within an environmental control system 20 (e.g., downstream of the primary heat exchanger 34). A low-pressure water separator, such as formed by combined operation of the condenser 48 and water extractor 50, may be configured to remove moisture at a lowest pressure within an environmental control system 20, such as at a turbine discharge pressure (e.g., mixed air exiting the turbine).

The system 20 additionally comprises at least one compressing device 60. In the illustrated, non-limiting embodiment, the system 20 includes a pair of compressing devices 60 arranged in parallel. However, a system 20 including more than two compressing devices 60 is also contemplated herein. The compressing devices 60 of the system 20, may, but need not be substantially identical.

Each compressing device 60 of the system 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of the compressing device 60 include an air cycle machine, a three-wheel air cycle machine, a four-wheel air cycle machine, etc.

Each compressing device 60 includes a compressor 62, a turbine 64, a power turbine 66, a fan 68 operably coupled via a shaft 70. The compressor 62 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 62 is configured to receive and pressurize the second medium A2.

The turbine 64 and the power turbine 66 are mechanical devices that expand and extract work from a medium (also referred to as extracting energy). In the compressing devices 60, the turbines 64, 66 drive the compressor 62 and the fan 68 via the shaft 70. The turbine 64 can be a dual entry turbine that includes a plurality of inlet gas flow paths, such as an inner flow path and an outer flow path, to enable mixing of alternative medium flows at the exit of the turbine. The inner flow path can be a first diameter, and the outer flow path can be a second diameter. The power turbine 66 can provide power assist to the turbine based on a mode of operation the system. In a non-limiting embodiment, the turbine 64 can comprise a first nozzle configured to accelerate the first medium A1 for entry into a turbine impeller and a second nozzle is configured to accelerate the second medium A2 for entry into the turbine impeller. The turbine impeller (not shown) can be configured with a first gas path configured to receive the first medium A1 from the first nozzle and with a second gas path configured to receive the second medium A2 from the second nozzle.

The fan 68 is a mechanical device that can force via push or pull methods a medium (e.g., ram air) through the shell 32 across the heat exchangers 34, 36 and at a variable cooling to control temperatures.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a pair of valves V1 control whether a portion of the flow of second medium A2 from the secondary heat exchanger 36 bypasses a pass through the dehumidification system 42 and the turbine 64 in accordance with a mode of the system 20. Similarly, a second valve V2 is configured to operable to direct a portion of the flow of first medium A1 from the primary heat exchanger to bypass the dehumidification system 42 and compression devices 60.

As previously described, the system 20 includes a plurality of compressing devices 60 operably coupled to the ram air circuit 30 and the dehumidification system 42 in parallel. Accordingly, a valve may be arranged at each location where a medium is provided to at least one compression device. For example, in the illustrated non-limiting embodiment, a third valve V3 is arranged upstream from a first inlet of the turbine 64, a fourth valve V4 is arranged upstream from a second inlet of the turbine 64, and a fifth valve V5 is arranged upstream form an inlet of the power turbines 66. Each of these valves V3-V5 is operable to direct a flow of medium into a portion (i.e. only one) or each of the compressing devices 60. In an embodiment, the system 20 is configured to operate through the use of these valves with reduced performance when only a portion of the compressing devices 60 are operational.

Note that a combination of components and elements of the system 20 can be referred to as an air conditioning package or a pack. The pack can exist between the inlet, the volume, the outlet, and an exhaust of the shell. In the illustrated, non-limiting embodiment, the system configuration is considered an integrated air conditioning pack because the flow from a single ram air circuit 30 and a single dehumidification system 42 is shared by each of the compression devices 60.

Operation of the system 20 will now be described with respect to an aircraft. The system 20 can be referred to as an advanced pneumatic system that mixes fresh air (e.g., the second medium A2) with bleed air (e.g., the first medium A1) to produce mixed air (e.g., the mixed medium AM) according to these operational embodiments. The (dual entry) turbine 64, the compressor 62, and the fan 68 can receive energy from or impart energy to the bleed air A1, the cabin discharge air A3, and the fresh air A2.

During a first mode of operation of the system 20, energy extracted from the bleed air A1 via the turbine 64 is used to power the compressor 62 to compress the fresh air A2. The act of compressing the fresh air A2 adds energy to the fresh air and that energy is used not only to drive the compressor 62, but also, in a bootstrapping effect, to drive rotation of the fan 68.

During a first mode of operation, the valve 40 operable to provide cabin discharge air to the system 20 is closed. As a result, the bleed air A1 drawn from either an engine or the auxiliary power unit (e.g., the inlet 22) passes through the outflow heat exchanger to 38 the primary heat exchanger 34, with no or minimal heat transfer occurring within the outflow heat exchanger. The primary heat exchanger 34 further cools the bleed air A1 to a nearly ambient temperature to produce cool bleed air. Valve V2 is arranged within a conduit, downstream from the primary heat exchanger 34. When the valve V2 is in a first position, after being cooled in the primary heat exchanger 34, the flow of bleed air A1 is configured to bypass the remainder of the system 20 and is directed into the volume 24. When the valve V2 is in a second position, the cool bleed air A1 is provided to the dehumidification assembly 42.

Within the dehumidification assembly 42, the cool bleed air A1 is first provided to the reheater 44, where the temperature of the bleed air A1 is increased. From the reheater 44, the warm bleed air flows through the water extractor 46 where moisture is removed to produce a warm, dry bleed air. From the dehumidification assembly 42, the warm, dry bleed air A1 is provided to the turbine 64 of one or both of the compression devices 60. In an embodiment, the warm, dry bleed air enters the turbines 64 through a first nozzle, where it is expanded and work is extracted.

The work extracted by the turbine 64 of one or both compression devices 60, is used by a corresponding compressor 62 used to compress the fresh air and drives the fan 68 used to move ram air through the ram air heat exchangers (e.g., the primary heat exchanger 34 and the secondary heat exchanger 36). The compressed fresh air A2 output from the compressor 62 has an increased temperature and pressure relative to the fresh air provided to the inlet of the compressor 62. The increased pressure fresh air from the compressor 62 of at least one of the compression devices 60 is then provided to the secondary heat exchanger 36, where it is cooled by ram air. Within the secondary heat exchanger 36, the fresh air A2 may be cooled to nearly ambient temperature to produce cool pressurized fresh air before being provided to a downstream portion of the system 20

Valves V1 are arranged downstream from the secondary heat exchanger 36 and upstream from the turbines 64. When the valves V1 are in a first position, after being cooled in the secondary heat exchanger 36, the flow of fresh air A2 is configured to bypass a pass through the dehumidification system and the turbines 64. As a result, when the valves are in the first position, at least a portion of the fresh air A2 output from the secondary heat exchanger 36 is provided directly to the condenser 48, where it is cooled, before being directed into the volume 24. When the valves V1 are in a second position, the fresh air A2 is provided to the dehumidification assembly 42.

Within the dehumidification assembly, the cool pressurized fresh air A2 is provided to a condenser 48, where the fresh air is cooled, and then to a water extractor 50 where any free moisture in the pressurized fresh air A2 is removed to produce dry pressurized fresh air. This dry, pressurized fresh air is heated within the reheater 44 before being provided to the turbine 64 of at least one compression mechanism 60 through a second nozzle. Within the turbine 64, the dry, warm pressurized fresh air A2 is expanded and work is extracted therefrom.

The two air flows (i.e., the bleed air A1 from the water extractor 46 and the fresh air A2 from the reheater 44) may be mixed at the turbine 64 to produce a mixed air AM. The mixed air AM leaves the turbine 64 and enters the condenser 48, where it is warmed through a heat exchanger relationship with the cool fresh air A2 output from the secondary heat exchanger 36. The conditioned mixed air AM is then sent to condition the volume 24.

The flow of the first medium A1, second medium A2, and Ram air are substantially identical in both the first mode (high altitude) and second mode (low altitude) of operation. However, during the first mode of operation, valve 40 is open and cabin discharge air A3 is provided to the outflow heat exchanger 38 of the system 20 from volume 24. Accordingly, in the first mode of operation, initial cooling of the first medium A1 occurs by transferring heat from the hot bleed air A1 to the cabin discharge air A3 within the outflow heat exchanger.

As previously described, the compressor 62 receives energy from the bleed air A1 via turbine 64 to compress the fresh air. However, this energy is not enough to drive the compressor 62. As a result, the cabin discharge air A3 output from the outflow heat exchanger 38 is provided to power turbine 66. The supplemental energy extracted from third medium A3 within the power turbine 66 is used to increase an amount of the fresh air compressed in the compressor 62. From the power turbine, the cabin discharge air A3 is provided into the ram air circuit where it is mixed with the ram air. With the ram air circuit, the mixture of ram air and cabin discharge air A3 passes through the secondary heat exchanger 36 and the primary heat exchanger 34 before being discharged overboard. In the illustrated, non-limiting embodiment, the duct 32 includes a plurality of independent outlets 80 for expelling a medium overboard, at least one outlet being associated with each compression device 60. As shown, the duct 32 includes a first outlet 80 and a second outlet 80 separated from one another by a distance and configured to expel a medium overboard at opposing sides of the system 20.

The integrated environmental control system 20 described herein has a reduced number of components compared to conventional 2 pack systems, resulting in both a cost and weight benefit. Further, by operably coupling a ram air circuit and dehumidification system to a plurality of compression devices 60, it is possible to mount the system 20 within a single bay of an aircraft, such as the tail cone for example.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft, comprising:
a ram air circuit including a ram air shell having at least one heat exchanger positioned therein;
a dehumidification system arranged in fluid communication with the ram air circuit;
a plurality of compressing devices arranged in fluid communication with the ram air circuit and the dehumidification system, wherein each of the plurality of compressing devices includes a compressor and at least one turbine; and
a plurality of mediums receivable within the environmental control system, wherein at least one of the plurality of mediums is output from at least one of the plurality of compressing devices into the ram air shell of the ram air circuit for mixing with a ram air flow;
the environmental control system being operable in a plurality of modes including a first mode and a second mode, wherein in the first mode, the compressor of at least one of the plurality of compressing devices receives energy from at least one of a first medium and a second medium of the plurality of mediums being expanded across the at least one turbine, and in the second mode, the compressor receives energy from the first medium, the second medium, and a third medium of the plurality of mediums being expanded across the at least one turbine.

2. The environmental control system of claim 1, wherein the plurality of compressing devices are arranged in parallel.

3. The environmental control system of claim 1, further comprising at least one valve operable to control a flow of one of the plurality of mediums to the plurality of compressing devices.

4. The environmental control system of claim 3, wherein in a first position, the at least one valve is configured to direct the flow of one of the plurality of mediums to only a portion of the plurality of compressing devices.

5. The environmental control system of claim 3, wherein in a first position, the at least one valve is configured to direct the flow of one of the plurality of mediums to each of the plurality of compressing devices.

6. The environmental control system of claim 1, wherein the ram air circuit includes a plurality of independent outlets formed in the ram air shell.

7. The environmental control system of claim 6, wherein at least one outlet is associated with each of the plurality of compressing devices.

8. The environmental control system of claim 1, wherein the plurality of compressing devices are substantially identical.

9. The environmental control system of claim 1, wherein the compressor is configured to compress the second medium; and
wherein a turbine of the at least one turbine comprises a first inlet and a second inlet and is configured to provide energy by expanding one or more of the plurality of mediums, the first inlet being configured to receive the first medium and the second inlet being configured to receive the second medium.

10. The environmental control system of claim 9, wherein during operation in at least one of the plurality of modes, the first medium and the second medium are mixed within the turbine.

11. The environmental control system of claim 9, wherein during operation in at least one of the plurality of modes, the first medium and the second medium are mixed downstream from the turbine.

12. The environmental control system of claim 9, wherein the first medium is bleed air and the second medium is fresh air.

13. The environmental control system of claim 9, wherein each of the compressing devices further includes a second turbine configured to provide energy to the compressor by expanding the third medium of the plurality of mediums.

14. The environmental control system of claim 13, wherein the turbine, compressor, and second turbine are operably coupled via a shaft.

15. The environmental control system of claim 9, wherein each of the plurality of compressing devices further includes a fan configured to receive energy from at least one of the first medium and the second mediums being expanded across the turbine.

16. The environmental control system of claim 1, wherein the environment control system is mounted within a single bay of the aircraft.

17. The environmental control system of claim 16, wherein the single bay includes a tail cone of the aircraft.

18. The environmental control system of claim 1, wherein the bleed air circuit is operably coupled to a first engine, a second engine, and an auxiliary power unit.

* * * * *